(12) United States Patent
Liu et al.

(10) Patent No.: US 9,471,633 B2
(45) Date of Patent: Oct. 18, 2016

(54) EIGENVALUE-BASED DATA QUERY

(71) Applicant: International Business Machines Corporation, Armonk, NY (US)

(72) Inventors: Jing Jing Liu, Beijing (CN); Lei Qiu, Beijing (CN); Chen Wang, Beijing (CN); Fu Fei Xu, Beijing (CN); Guang Zhou Zhang, Beijing (CN); Sheng Zhao, Beijing (CN); Zan Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 14/196,112

(22) Filed: Mar. 4, 2014

(65) Prior Publication Data
US 2014/0358895 A1    Dec. 4, 2014

(30) Foreign Application Priority Data

May 31, 2013 (CN) .......................... 2013 1 0211748

(51) Int. Cl.
G06F 17/30 (2006.01)
(52) U.S. Cl.
CPC ... G06F 17/30463 (2013.01); G06F 17/30474 (2013.01)
(58) Field of Classification Search
CPC .................. G06F 17/30463; G06F 17/30433
See application file for complete search history.

(56) References Cited

U.S. PATENT DOCUMENTS

| | | | |
|---|---|---|---|
| 6,466,931 B1 | 10/2002 | Attaluri et al. | |
| 7,831,569 B2 | 11/2010 | Bestgen et al. | |
| 7,895,187 B2 | 2/2011 | Bowman | |
| 7,917,502 B2 | 3/2011 | Cheng et al. | |
| 8,209,664 B2 | 6/2012 | Yu et al. | |
| 8,290,977 B2 | 10/2012 | Chinchwadkar et al. | |
| 2003/0204502 A1* | 10/2003 | Tomlin | G06F 17/12 |
| 2004/0078363 A1* | 4/2004 | Kawatani | G06F 17/30011 |
| 2008/0091646 A1 | 4/2008 | Al-Omari et al. | |
| 2008/0183684 A1 | 7/2008 | Bestgen et al. | |
| 2009/0125498 A1* | 5/2009 | Cao | G06F 17/30864 |
| 2012/0259840 A1 | 10/2012 | Nica | |
| 2012/0271815 A1 | 10/2012 | Pennell, Sr. et al. | |
| 2013/0191179 A1* | 7/2013 | Yan | G06Q 30/02 705/7.31 |

OTHER PUBLICATIONS

M. Cermak, et al., "SPARQL Compiler for Bobox," SEMAPRO 2010: The Fourth International Conference on Advances in Semantic Processing; Copyright (c) IARIA, 2010; pp. 100-105.

* cited by examiner

Primary Examiner — Rehana Perveen
Assistant Examiner — Raheem Hoffler
(74) Attorney, Agent, or Firm — Cantor Colburn LLP; Terry Carroll

(57) ABSTRACT

Embodiments relate to an eigenvalue-based data query. An aspect includes receiving a query request that includes a query statement. Another aspect includes calculating eigenvalues of key component elements in the query statement. Another aspect includes matching eigenvalues of nodes in an execution plan of a historical query statement to the eigenvalues of the key component elements. Yet another aspect includes based on determining success of matching the eigenvalues of the key component elements to the eigenvalues of the nodes in an execution plan of the historical query statement, generating an execution plan of the query statement.

20 Claims, 6 Drawing Sheets

EIGENVALUE-BASED DATA QUERY

PRIORITY

This application claims priority to Chinese Patent Application No. 201310211748.1, filed May 31, 2013, and all the benefits accruing therefrom under 35 U.S.C. §119, the contents of which in its entirety are herein incorporated by reference.

BACKGROUND

The present disclosure relates generally to data processing technology, and more specifically, to an eigenvalue-based data query.

When a database management system processes a query request from a user, there are multiple execution paths for executing the query, but the cost for some execution paths (such as query time) is high while the cost for some execution paths is low. Thus, the execution path of a query generally needs to be optimized in advance, for example, the query optimizer used in the current dominant database management system in the art mainly uses two optimization methods of "rule-based" and "cost-based" to optimize a SQL statement and generate a relatively better query plan. However, in some cases, the automatic optimization process by an optimizer may generate an execution plan having unacceptable performances. For example, the database management system may have been adjusted for the previous typical application (common Structured Query Language SQL statement). But, for a new SQL statement, the original adjusting parameter may not be applicable, and thus the optimizer may generate an execution path having poor efficiency. In a real application system, the SQL statement is generally very long and very complex. The algorithm of the optimizer cannot generate an optimal execution plan due to its limitation, and it's a time-consuming job for the system to optimize and compile these SQL statements.

In an adjusted database system, for new SQL statements, the previously optimized query plans should be utilized as much as possible so as to reduce the time for compiling and optimizing the SQL statements. Currently, in the dominant commercial database management system, in the widely used query plan reuse method the query plan is taken as a whole for reuse, while the execution plan cannot be divided into finer grains, which causes low reuse efficiency; and generally, the query plan is reused by matching and reusing through a simple method of matching texts of SQL statements, and the matching efficiency is low.

SUMMARY

Embodiments include a method, system, and computer program product for an eigenvalue-based data query. An aspect includes receiving a query request that includes a query statement. Another aspect includes calculating eigenvalues of key component elements in the query statement. Another aspect includes matching eigenvalues of nodes in an execution plan of a historical query statement to the eigenvalues of the key component elements. Yet another aspect includes based on determining success of matching the eigenvalues of the key component elements to the eigenvalues of the nodes in an execution plan of the historical query statement, generating an execution plan of the query statement.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Figure 1:
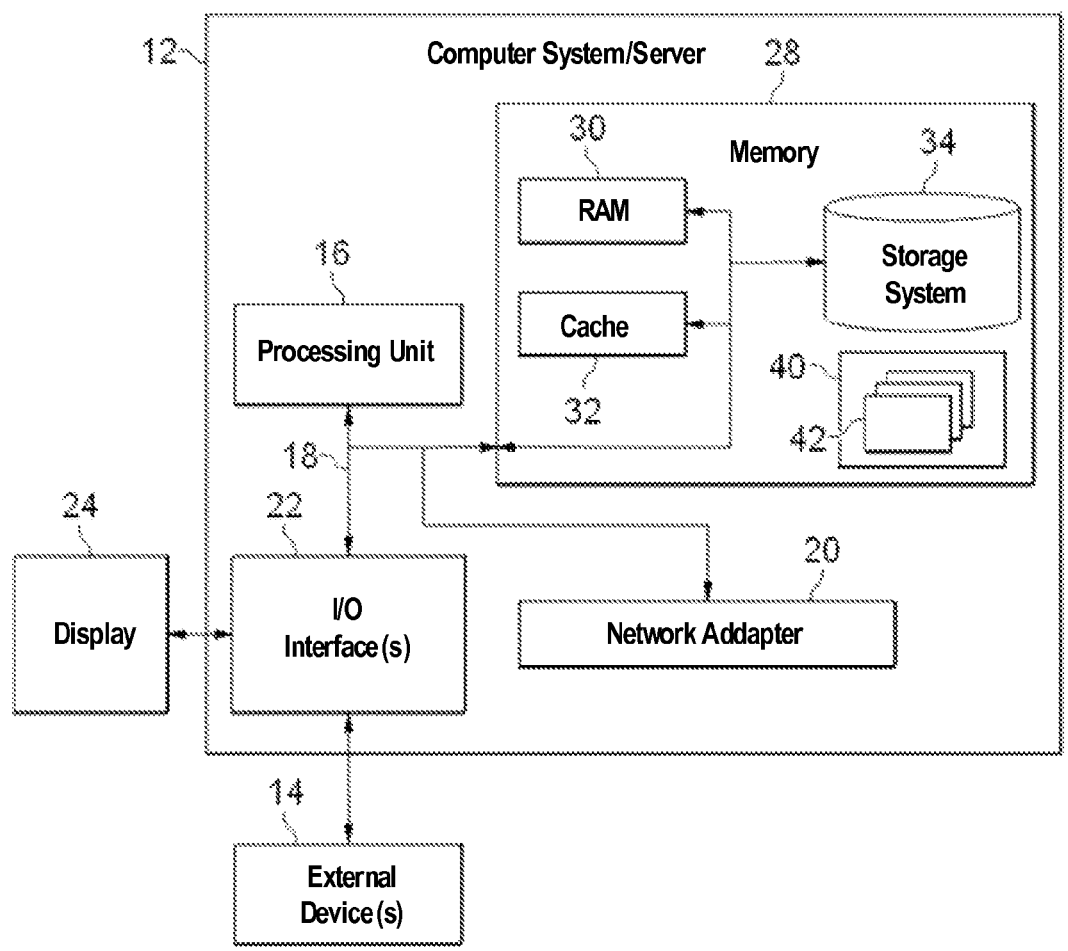
FIG. 1 shows a block diagram of an exemplary computer system/server which is applicable to implement embodiments of an eigenvalue-based data query.

Embodiments disclosed herein relate to an eigenvalue-based data query. Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, various embodiments may be embodied as a system, method or computer program product. Accordingly, various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, various embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for various embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational blocks to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement various embodiments is shown. Computer system/server 12 is only illustrative and is not intended to suggest any limitation as to the scope of use or functionality of various embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of various embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
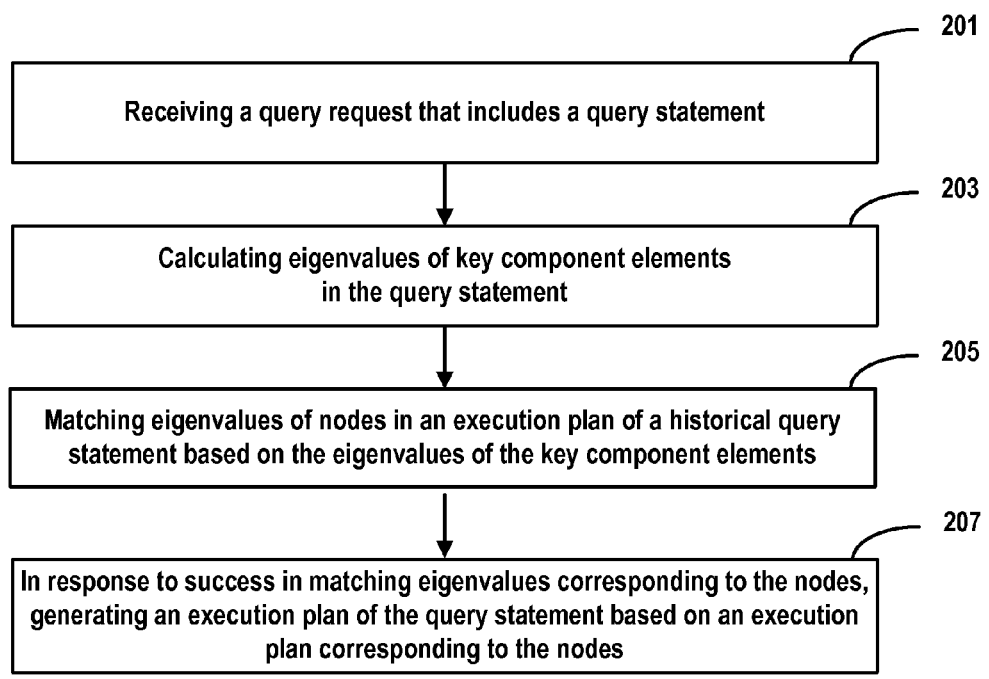
FIG. 2 shows an embodiment of a method for an eigenvalue-based data query.

With reference now to FIG. 2, an embodiment of a method for a data query is generally shown. In block 201, a query request that includes a query statement is received. The query statement may be a structured query language statement. An example of a query statement is: select * from T1,T2 where T1.C1=T2.C2. In block 203, eigenvalues of key component elements in the query statement are calculated. Generally speaking, the key component elements in the query statement are mainly tables, columns and predicates that operate the tables and columns. Any other appropriate component elements in the query statement may be determined as key component elements, e.g. related sets involved in the aggregation operation, sorting operation, duplicate removal operation, etc. Respective key component elements involved in a query statement may be assigned with a globally unique value by a unified specific encoding method, thereby obtaining eigenvalues of the key component elements in the query statement. The specific encoding method may employ a bitmap coding method, and in the bitmap coding method, a value corresponding to certain element is marked by using one bit. Bitmap coding methods are known in the art. Bitmap is a data structure that is suitable for a fine-grained query execution plan proposed in various embodiments, and it has the following features: a) it may use a unified way to represent basic elements and combination of the elements; b) it has good scalability; c) it has good support for comparison, combination and separation operations; d) it has a compressed storage format to save storage space. However, regarding how to use the bitmap coding to represent the bitmap eigenvalues of key component elements of the query language, it will be described below in detail. Any appropriate encoding method may be employed in various embodiments, while the description below will introduce various embodiments mainly based on the bitmap encoding method.

In block 205, eigenvalues of nodes in an execution plan of a historical query statement are matched based on the eigenvalues of the key component elements. Generally speaking, a database management system stores an adjusted execution plan of a historical query statement, and the existing execution plans are all stored in the form of a tree structure, wherein the root node and respective nodes are generally predicates while the leaf nodes are objects on which the predicates operate and generally are tables or columns of tables. The execution plan corresponding to nodes of the execution plan refers to an execution plan consisting of the nodes as well as all sub nodes and all leaf nodes of the nodes. For example, the execution plan corresponding to the root node of an execution plan refers to the whole execution plan, while the execution plan corresponding to another sub node refers to the execution plan consisting of the sub node as well as all sub nodes and all leaf nodes of the sub node. The eigenvalues of respective nodes may be generated in advance using the bitmap encoding method based on the table, column or predicate operations involved in the nodes of these optimized execution plans and their sub nodes and leaf nodes. Generation of the bitmap eigenvalues of nodes will be described below in more detail.

In block 207, in response to success in matching eigenvalues corresponding to the related nodes, an execution plan of the query statement is generated based on an execution plan corresponding to the related nodes. The execution plan corresponding to the related nodes is taken as at least one part of the execution plan of the query statement. During the above matching process, the matching generally starts from the root node of the execution plan, and may use accurate matching, subset matching, superset matching and fuzzy matching, etc., wherein the accurate matching means that the bitmap eigenvalues of the query statement are completely identical to the Bitmap eigenvalues of all nodes in the execution plan; this type of matching may be adapted for different orders of the tables, columns and predicates in different queries; if the eigenvalues of the nodes are completely the same, the matching is finished, and the execution plan is taken as the execution plan of a new input query statement. The subset matching refers that when the eigenvalues of the new input query statement are consistent with part of the Bitmap eigenvalues of the nodes of the existing execution plan, the execution plan of this part may be used directly. The so-called superset matching refers that the eigenvalues of the new input statement contain the bitmap eigenvalues of the nodes of the existing execution plan, i.e. is a superset, then, a new execution plan is generated based on the existing execution plan. It needs to be noted that after meeting the nodes that conform to the superset matching, this part of execution plan is directly used to generate a new execution plan, while the remaining unmatched parts of the query statement are matched with the eigenvalues of the other existing execution plans, and finally all matched parts of execution plans are combined to generate new execution plans. If the remaining eigenvalues do not match with any of the eigenvalues of the other existing execution plans, the remaining plans are regenerated based on the original method for generating execution plans. The fuzzy matching refers that when the eigenvalues of the new input query statement are consistent with the eigenvalues of part of the nodes of the execution plan of the historical query statement as much as possible, the matched part may be cut out and adapted to part of the execution plan of the historical query statement. Certainly, those skilled in the art know that when it is impossible to find a matched execution plan in the existing execution plan of the historical query statement, it needs to build a new execution plan for the query statement of the query request based on the prior art.

The method for data query in various embodiments further comprises using at least one of the following data structures: a global table set sequence established based on a database management system (DBMS); a global column set sequence established based on corresponding columns of all the tables; corresponding predicate bitmap codes established for all predicates in the database management system. Generally speaking, the key component elements of a query statement comprise tables, columns and predicates, but are not limited to these key component elements. Those skilled in the art may further take other key component elements as the key component elements such as the aggregation operation, sorting operation, duplicate removal operation, etc., based on the various embodiments and according to the actual needs, wherein the structure of the Global Table Set Sequence may be in a form of an array, etc.; for example, the structure of each record may be as follows:

```
TableList
    {
        int index;      // index, globally unique table number
        char* name;     // table name
    }
```

The data structure of each record in the Global Column Set Sequence may employ the structure as below:

```
ColumnList
    {
        int index;          // index, globally unique column number
        char *columnname;   //column name
        char *tablename;    //table name to which each column belonging
    }
```

The data structure indicative of the bitmap eigenvalues of a predicate may be:

```
Predicate
{
    BYTE predCode;
    //predicate code, e.g. predicate "=" can be encoded as
    ( 0x ) 0100
    BYTE operands[n]; // bitmap of operand
}
```

An embodiment of how to calculate the eigenvalues of the key component elements in a query statement will be introduced below in detail. Since at least one of the global table set sequence, the global column set sequence and the predicate bitmap codes has been established, the global table set sequence, the global column set sequence and the predicate bitmap code may be established simultaneously, and the table bitmap eigenvalues, the column bitmap eigenvalues and the predicate bitmap eigenvalues of the query statement can be calculated based on the global table set sequence, the global column set sequence and the predicate bitmap code. The global table set sequence and global column set sequence are generated based on all tables and columns within the system so as to determine that the set of all tables or specified tables and their columns within the database all have unique bitmap positions. The database management system is assumed to include four tables: T1(C1, C2); T2(C1, C2); T3(C1); T4(C1), then its global table set sequence is: T1, T2, T3, T4. Due to there are four tables, its corresponding bitmap code should have a 4-bit sequence, wherein T1 corresponds to the first bit of the bit sequence; T2 corresponds to the second bit of the bit sequence, and so on. Its global column set sequence is: T1.C1, T1.C2, T2.C1, T2.C2, T3.C1, T4.C1; due to there are six bits, its corresponding bitmap code should have 6-bit sequence, wherein T1.C1 corresponds to the first bit of the bit sequence; T1.C2 corresponds to the second bit of the bit sequence, and so on. Bitmap encoding is carried out for respective predicates in the database management system. For example, predicates >, <, =, >=, <=, < >, . . . , then their bitmap codes may be exemplarily stipulated as 0001, 0010, 0100, 0101, 0110, 0011, . . . , respectively, to thereby ensure that each predicate in the database management system may have a globally unique bitmap bit value. Certainly, one possible extension is to encode and match all predicates by using an encoding method similar to that for tables and columns.

Figure 3:
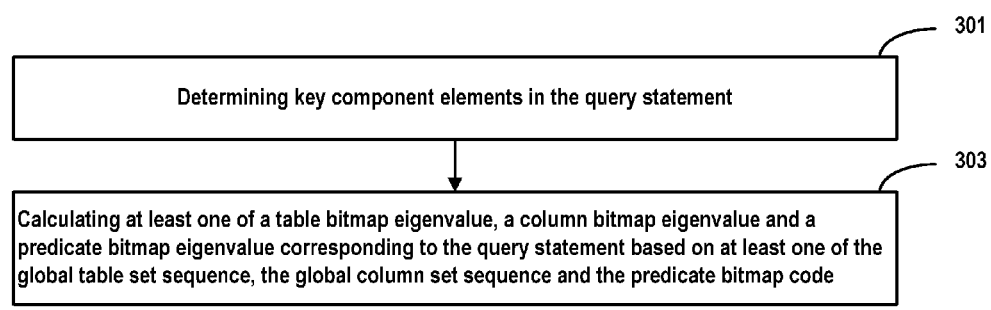
FIG. 3 shows an embodiment of how to determine eigenvalues of key component elements in a query statement.

FIG. 3 shows an embodiment of how to determine eigenvalues of key component elements in one query statement. In block 301, the key component elements in one query statement are determined. In block 303, at least one of a table bitmap eigenvalue, a column bitmap eigenvalue and a predicate bitmap eigenvalue corresponding to the query statement is calculated based on at least one of the global table set sequence, the global column set sequence and the predicate bitmap codes. The query statement select * from T1,T2 where T1.C1=T2.C2 is taken as an example, wherein the key component elements are tables T1, T2, columns T1.C1, T2.C2 and predicate "=." Considering the established global table set sequence previously mentioned, the table bitmap eigenvalue of the query statement is: 1100 which indicates that the table bitmap eigenvalue corresponding to the query statement in the global table set sequence is 1100, that is, the query statement only relates to tables T1, T2, and thus its value on corresponding bit in corresponding bitmap is 1, while the query statement does not relate to tables T3, T4, and thus its value on corresponding bit in corresponding bitmap is 0, thereby obtaining the table bitmap eigenvalue of the query statement as: 1100. By analogy, it can be learned that the column bitmap eigenvalue of the query statement is: 100100. Since the predicate portion relates to predicates (operation per se) and data operated by predicates, according to the way of expressing the predicate structure as previously mentioned, the predicate bitmap eigenvalue of the query statement is: 0100 100100, wherein 0100 is the bitmap code of the predicate "=" itself, while 100100 is the column bitmap eigenvalue of the query statement and represent the meaning of "where T1.C1=T2.C2" in the query statement.

Figure 4:
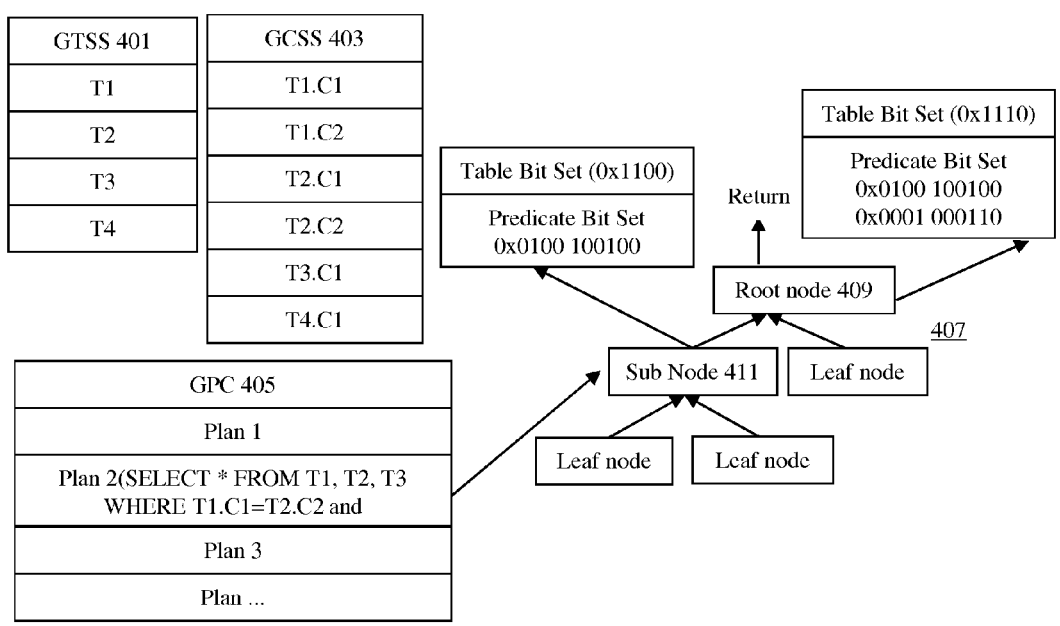
FIG. 4 shows an embodiment of determining bitmap eigenvalues of a node of an execution plan.

FIG. 4 shows an embodiment of determining bitmap eigenvalues of a node of an execution plan. At least one of a table bitmap attribute eigenvalue, a column bitmap attribute eigenvalue and a predicate bitmap attribute eigenvalue corresponding to at least one node of the execution plan is calculated based on at least one of the global table set sequence, the global column set sequence and the predicate bitmap code of the database management system, wherein the calculating at least one of a table bitmap attribute eigenvalue, a column bitmap attribute eigenvalue and a predicate bitmap attribute eigenvalue corresponding to at least one node of the execution plan based on at least one of the global table set sequence, the global column set sequence and the predicate bitmap code further comprises: calculating the table bitmap attribute eigenvalue, the column bitmap attribute eigenvalue and the predicate bitmap attribute eigenvalue of at least one node of the execution plan based on at least one of all tables, all columns and all predicates involved in sub nodes and leaf nodes corresponding to the at least one node and the at least one node, in combination with at least one of the global table set sequence, global column set sequence and predicate bitmap codes. Generally speaking, the optimized execution plan of a historical query statement is usually divided into a query tree structure consisting of execution plan nodes. Each node will be implemented as a type or structure body in the program implementation, wherein various attributes corresponding to the node will be stored. Various embodiments will extend the execution plan nodes of the existing database management system, and add one or more bitmap attributes therein to represent all key component elements involved in the execution plan expressed by an execution plan tree that takes the node as the parent node:

```
Node{
    .... // Original Fields
    BYTE TableBitMap[n];
    BYTE ColumnBitMap[n];
    BYTE PredicateBitMap[n];
}
```

Wherein TableBitMap[n] is used to describe the table bitmap attribute eigenvalues of all tables that the node relates to; ColumnBitMap[n] is used to describe the column bitmap attribute eigenvalues of all columns that the node relates to; PredicateBitMap[n] is used to describe the predicate bitmap attribute eigenvalues of all predicates that the node relates to. Certainly, those skilled in the art know that it is possible to only add at least one of the above attributes to the node. With reference now to FIG. 4, FIG. 4 exemplarily shows a global table set sequence 401 (GTSS: Global Table Set Sequence) and a global column set sequence 403 (GCSS: Global Column Set Sequence). In order to accelerate the matching speed, the frequently matched query plans in the global execution plan list 405 (GPC: Global Plan Cache) that stores optimized historical query language execution plans can be stored in the local cache, and the rest can be stored in the hard disk to accelerate the matching speed and save space, while the execution plan node tree 407 exemplarily shows the tree structure of the execution plan of the historical query statement "Select * from T1,T2,T3 where T1.C1=T2.C2 and T2.C2>T3.C1." For the root node 409, it can be determined, by a depth or breadth traversal method, that the root node 409 totally involves three tables T1, T2 and T3, involves columns T1.C1, T2.C2, T3.C1 and involves predicates "=" (0x0100) and ">" (0x0001). According to the previously introduced method, it can be learned that the table bitmap attribute eigenvalue of the root node 409 is: (0x) 1110, wherein it is well known that 0x is used to indicate that the code is binary. The predicate bitmap attribute eigenvalues are: '0x0100 100100' and '0x0001 000110,' which are used to represent the predicate portion "where T1.C1=T2.C2 and T2.C2>T3.C1." The table bitmap attribute eigenvalue (Table Bit Set) and the predicate bitmap attribute eigenvalues (Predicate Bit Set) of the root node are respectively given to the root node and are stored. By analogy, it can be learned that the table bitmap attribute eigenvalue and the predicate bitmap attribute eigenvalue of the sub node 411 are respectively 0x1100 and '0x0100 100100.' FIG. 4 shows the bitmap attribute eigenvalues of the root node 409 and the sub node 411. For a leaf node, generally it is unnecessary to give related bitmap attribute eigenvalues to its extended bitmap attributes. FIG. 4 shows a structure tree having three layers, i.e. root node 409, sub node and leaf node. For a structure tree having more layers, those skilled in the art fully can perform a traversal calculation for each node and give it related bitmap attribute eigenvalues based on the example of FIG. 4. Thus, the execution plan tree with respective nodes having related bitmap attribute eigenvalues can be established. Those skilled in the art know that it may be possible to only calculate part of the nodes of the execution plan tree and give them related bitmap attribute eigenvalues.

Figure 5:
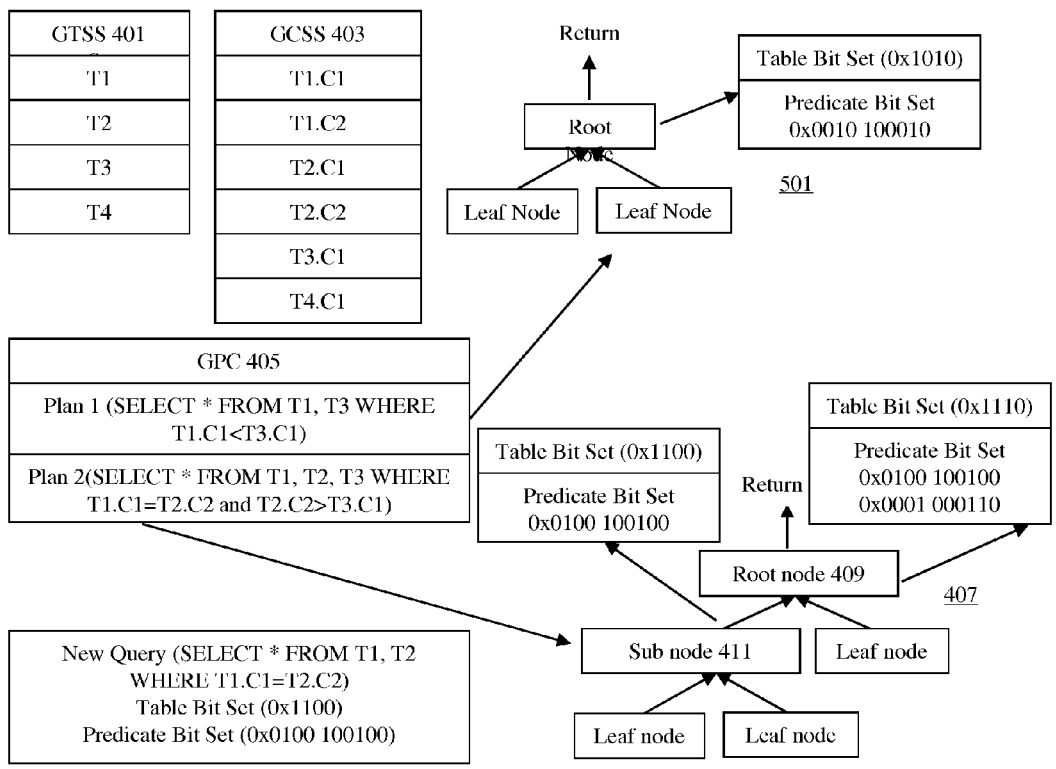
FIG. 5 shows an embodiment of an eigenvalue-based data query.
Figure 6:
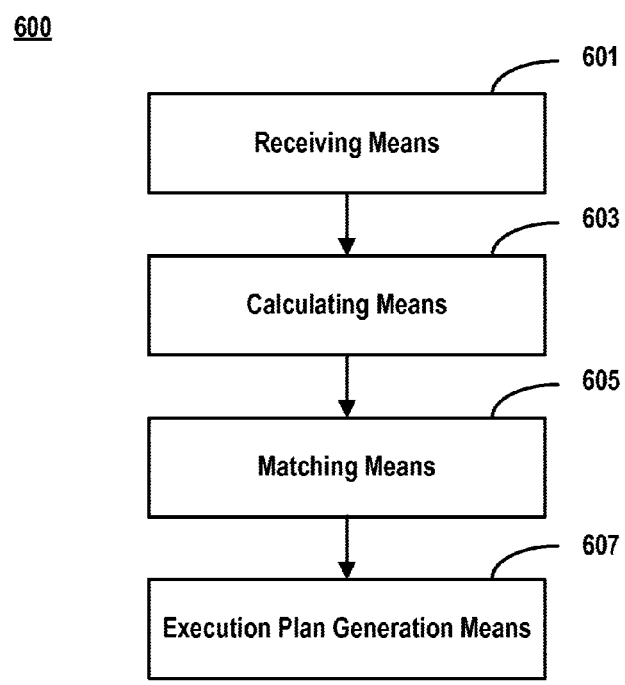
FIG. 6 shows a schematic diagram of an embodiment of a framework of an eigenvalue-based data query system.

After having obtained the bitmap eigenvalues of the key component elements of the newly input query language, the bitmap eigenvalues of the key component elements of the query language can be matched with the stored bitmap attribute eigenvalues of the nodes of respective execution plans. The matching in the prior art is the matching of the entire query, for example, only when the new query and the old query text completely match, can the query plans match. However, one embodiment uses bitmap to describe each node of the query plan; a new query may partially match with the old query; after matched nodes are found, part of the original query plan may be reused to thereby greatly increasing the utilization rate of the originally optimized execution plans and largely saving the cost for generating the execution plan for new query languages. Respective bitmap eigenvalues of the key component elements of a query language in a query request may be used to match with respective nodes of respective execution plans in the global execution plan list one by one, and regarding the matching algorithms, those skilled in the art may employ, based on actual needs, at least one of the accurate matching, subset matching, superset matching and fuzzy matching. The traversal for matching respective nodes of an execution plan may employ a breadth-first or depth-first algorithm. For the matching of respective execution plans in the global execution plan list, it may employ a parallel manner for matching, and may also employ a manner of serial traversal one by one until matched execution plan nodes are found. Certainly, those skilled in the art may conceive, based on the present application, various methods for traversing respective nodes of respective execution plans. The eigenvalues of the key component elements and corresponding eigenvalues of nodes in the execution plan may be taken an AND operation, and in response to a result from the AND operation being equal to the eigenvalues of the key component elements, the success in matching eigenvalues corresponding to the nodes are determined. When matched with one node, the execution plan corresponding to the node can be taken as at least one part of the execution plan of the query statement. FIG. 5 shows an embodiment of a data query. As described above, a Global Table Set Sequence 401: T1, T2, T3, T4, a Global Column Set Sequence 403: T1.C1, T1.C2, T2.C1, T2.C2, T3.C1, T4.C1 and a global execution plan list 405 are maintained in the database management system, and it is exemplarily shown that the following optimized SQLs are contained:

Plan1 (Select * from T1, T3 where T1.C1<T3.C1)

Plan2 (Select * from T1, T2, T3 where T1.C1=T2.C2 and T2.C2>T3.C1)

Where the execution Plan 1 (Plan 1) is represented by a tree storage structure 501, and the execution Plan 2 (Plan 2) is represented by a tree storage structure 407, wherein the table bitmap attribute eigenvalue generated for the root node of the execution Plan 1 is: 1010; the column bitmap attribute eigenvalue is: 100110; and the predicate bitmap attribute eigenvalues are: 0010 100100 and 0001 000110. The table bitmap attribute eigenvalue generated for the root node 503 of the Plan 2 is: 1110; the column bitmap attribute eigenvalue is: 100110; and the predicate bitmap attribute eigenvalues are: 0100 100100 and 0001 000110. The table bitmap attribute eigenvalue generated for the sub node 411 of the Plan 2 is: 1100; the column bitmap attribute eigenvalue is: 100100; and the predicate bitmap attribute eigenvalue is: 0100 100100. As described above, the table bitmap eigenvalue is generated as 1100; the column bitmap eigenvalue is generated as 100100; and the predicate bitmap eigenvalue is generated as 0100 100100 based on the input new query statement (select * from T1, T2 where T1.C1=T2.C2). During the matching process, new Plan and Plan 1 perform corresponding matching algorithm (accurate matching, subset matching, superset matching and fuzzy matching, etc.) to the future available table eigenvalues. In this example, when the superset or subset matching are selected in the match, the eigenvalues of the key component elements of the new query statement and the eigenvalues of nodes in the execution plan are taken an AND operation, which is a manner of matching used in some embodiments. For example, when the bitmap eigenvalues of the key component elements of the new query statement are compared with the bitmap attribute eigenvalues of the root node 501 of the Plan 1, if the table eigenvalues are compared first, it will be found that the result, as obtained from taking an AND operation to the table bitmap attribute eigenvalues of the root node 501 of the Plan 1 and the table bitmap eigenvalues of the new query statement, 1010&1100=1000 !=1010 or 1100, that is, the result 1000 is not equal to any of the table bitmap attribute eigenvalues of the Plan 1 and the table bitmap eigenvalues of the new query statement, and thus the Plan 1 does not match the root node 501 of the query statement, and thereby it is unnecessary to perform a further matching of the sub node of the Plan 1. However, for Plan 2, the table bitmap eigenvalues and the column bitmap eigenvalues of the new query statement match with the corresponding bitmap attribute eigenvalues of the Plan 2, but the predicate bitmap eigenvalues of the new query statement is a subset of the corresponding predicate bitmap attribute eigenvalues of the Plan 2 (note that the matching of predicates is performed one by one, for example, the matching of each predicate of the new query statement is performed with one of all predicates of the existing execution plans one by one, rather than performing the matching in one round like the table or column matching). And thus the matching of the sub node 411 should be performed, and if it is found that the bitmap eigenvalues of the key elements of the new query statement completely match with the corresponding bitmap attribute eigenvalues of the Plan 2, it means that the execution plan corresponding to the sub node 411 of the Plan 2 may be partially taken by the new query statement in building an execution plan, wherein the execution plan corresponding to the sub node 411 is the execution plan consisting of the sub node 411 and two leaf nodes of the sub node 411, thereby greatly saving the cost for regenerating the execution plan of the query statement by using the existing method.

According to another aspect, there is further provided a system 600 for data query. The system 600 comprises: receiving means 601 configured to receive a query request that includes a query statement; calculating means 603 configured to calculate eigenvalues of key component elements in the query statement; matching means 605 configured to match eigenvalues of nodes in an execution plan of a historical query statement based on the eigenvalues of the key component elements; execution plan generation means 607 configured to, in response to success in matching eigenvalues corresponding to the nodes, generate an execution plan of the query statement based on an execution plan corresponding to the nodes. The specific implementation methods of the receiving means 601, calculating means 603, matching means 605 and execution plan generation means 607 have been described above in detail, which is not detailed here.

In some embodiments, the system 600 further comprises at least one of: global table set sequence establishing means configured to establish a global table set sequence based on all tables in a database management system; global column set sequence establishing means configured to establish a global column set sequence based on corresponding columns of all the tables; and predicate bitmap code establishing means configured to establish corresponding predicate bitmap codes for all predicates in the database management system.

In some embodiments, wherein the calculating eigenvalues of key component elements in the query statement comprises: calculating at least one of a table bitmap eigenvalue, a column bitmap eigenvalue and a predicate bitmap eigenvalue corresponding to the query statement based on at least one of the global table set sequence, the global column set sequence and the predicate bitmap code, wherein the key component elements include at least one of: a table, a column and a predicate.

In some embodiments, the system 600 further comprises: bitmap attribute adding means configured to add, to at least one node of the execution plan of the historical query statement, at least one of the following bitmap attributes: a table bitmap attribute, a column bitmap attribute and a predicate bitmap attribute.

In some embodiments, the system 600 further comprises: bitmap attribute eigenvalue calculating means configured to calculate at least one of a table bitmap attribute eigenvalue, a column bitmap attribute eigenvalue and a predicate bitmap attribute eigenvalue corresponding to at least one node of the execution plan based on at least one of the global table set sequence, the global column set sequence and the predicate bitmap codes.

In some embodiments, wherein the bitmap attribute eigenvalue calculating means further comprises: means configured to calculate the table bitmap attribute eigenvalue, the column bitmap attribute eigenvalue and the predicate bitmap attribute eigenvalue of at least one node of the execution plan based on at least one of all tables, all columns and all predicates involved in sub nodes and leaf nodes corresponding to the at least one node and the at least one node, in combination with at least one of the respective global table set sequence, global column set sequence and predicate bitmap codes.

In some embodiments, wherein the matching eigenvalues of nodes in an execution plan of a historical query statement based on the eigenvalues of the key component elements comprises at least one of: accurate matching, subset matching, superset matching and fuzzy matching.

In some embodiments, the matching means comprises: AND operation means configured to take an AND operation to the eigenvalues of the key component elements and corresponding eigenvalues of nodes in the execution plan and; determining matching means configured to, in response to a result from the AND operation being equal to the eigenvalues of the key component elements, determine the success in matching eigenvalues corresponding to the nodes.

In some embodiments, the execution plan generation means comprises: means configured to specify the execution plan corresponding to the nodes as at least one part of the execution plan of the query statement.

In some embodiments, the execution plan of the historical query statement is an optimized execution plan.

In some embodiments, the query statement is a Structured Query Language.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A method for an eigenvalue-based data query, comprising:
   receiving a query request that includes a query statement;
   calculating eigenvalues of key component elements in the query statement;
   matching eigenvalues of nodes in an execution plan of a historical query statement to the eigenvalues of the key component elements;
   based on determining success of matching the eigenvalues of the key component elements to the eigenvalues of the nodes in the execution plan of the historical query statement, generating an execution plan of the query statement; and
   establishing a global table set sequence based on all tables in a database management system.

2. The method according to claim 1, further comprising at least one of:
   establishing a global column set sequence based on corresponding columns of all the tables; and
   establishing corresponding predicate bitmap codes for all predicates in the database management system.

3. The method according to claim 2, wherein the calculating eigenvalues of key component elements in the query statement comprises:
   calculating at least one of a table bitmap eigenvalue, a column bitmap eigenvalue and a predicate bitmap eigenvalue corresponding to the query statement based on at least one of the global table set sequence, the global column set sequence and the predicate bitmap codes, wherein the key component elements include at least one of: a table, a column and a predicate.

4. The method according to claim 2, further comprising:
   adding, to at least one node of the execution plan of the historical query statement, at least one of: a table bitmap attribute, a column bitmap attribute and a predicate bitmap attribute.

5. The method according to claim 4, further comprising:
   calculating at least one of a table bitmap attribute eigenvalue, a column bitmap attribute eigenvalue and a predicate bitmap attribute eigenvalue corresponding to at least one node of the execution plan based on at least one of the global table set sequence, the global column set sequence and the predicate bitmap codes.

6. The method according to claim 5, wherein the calculating at least one of a table bitmap attribute eigenvalue, a column bitmap attribute eigenvalue and a predicate bitmap attribute eigenvalue corresponding to at least one node of the execution plan based on at least one of the global table set sequence, the global column set sequence and the predicate bitmap codes further comprises:
   calculating the table bitmap attribute eigenvalue, the column bitmap attribute eigenvalue and the predicate bitmap attribute eigenvalue of at least one node of the execution plan based on at least one of all tables, all columns and all predicates involved in sub nodes and leaf nodes corresponding to the at least one node and the at least one node, in combination with at least one of the respective global table set sequence, global column set sequence and predicate bitmap codes.

7. The method according to claim 1, wherein matching the eigenvalues of the nodes in the execution plan of the historical query statement to the eigenvalues of the key component elements comprises at least one of: accurate matching, subset matching, superset matching and fuzzy matching.

8. The method according to claim 1, wherein matching the eigenvalues of the nodes in the execution plan of the historical query statement to the eigenvalues of the key component elements comprises:
   taking an AND operation to the eigenvalues of the key component elements and corresponding eigenvalues of nodes in the execution plan;
   based on a result from the AND operation being equal to the eigenvalues of the key component elements, determining the success of matching the eigenvalues of the key component elements to the eigenvalues of the nodes in the execution plan of the historical query statement.

9. The method according to claim 1, wherein the generating an execution plan of the query statement comprises:
   specifying the execution plan corresponding to the nodes as at least one part of the execution plan of the query statement.

10. The method according to claim 1, wherein the query statement is a Structured Query Language (SQL).

11. A computer system for an eigenvalue-based data query, the system comprising:

a memory having computer readable computer instructions; and a processor for executing the computer readable instructions, the instruction including:

receiving a query request that includes a query statement;

calculating eigenvalues of key component elements in the query statement;

matching eigenvalues of nodes in an execution plan of a historical query statement to the eigenvalues of the key component elements;

based on determining success of matching the eigenvalues of the key component elements to the eigenvalues of the nodes in the execution plan of the historical query statement, generating an execution plan of the query statement; and establishing a global table set sequence based on all tables in a database management system.

12. The system according to claim 11, further comprising at least one of:

establishing a global column set sequence based on corresponding columns of all the tables; and establishing corresponding predicate bitmap codes for all predicates in the database management system.

13. The system according to claim 12, wherein the calculating eigenvalues of key component elements in the query statement comprises:

calculating at least one of a table bitmap eigenvalue, a column bitmap eigenvalue and a predicate bitmap eigenvalue corresponding to the query statement based on at least one of the global table set sequence, the global column set sequence and the predicate bitmap codes, wherein the key component elements include at least one of: a table, a column and a predicate.

14. The system according to claim 12, further comprising:

adding, to at least one node of the execution plan of the historical query statement, at least one of: a table bitmap attribute, a column bitmap attribute and a predicate bitmap attribute.

15. The system according to claim 14, further comprising:

calculating at least one of a table bitmap attribute eigenvalue, a column bitmap attribute eigenvalue and a predicate bitmap attribute eigenvalue corresponding to at least one node of the execution plan based on at least one of the global table set sequence, the global column set sequence and the predicate bitmap codes.

16. The system according to claim 15, wherein the calculating at least one of a table bitmap attribute eigenvalue, a column bitmap attribute eigenvalue and a predicate bitmap attribute eigenvalue corresponding to at least one node of the execution plan based on at least one of the global table set sequence, the global column set sequence and the predicate bitmap codes further comprises:

calculating the table bitmap attribute eigenvalue, the column bitmap attribute eigenvalue and the predicate bitmap attribute eigenvalue of at least one node of the execution plan based on at least one of: all tables, all columns and all predicates involved in sub nodes and leaf nodes corresponding to the at least one node and the at least one node, in combination with at least one of the respective global table set sequence, global column set sequence and predicate bitmap codes.

17. The system according to claim 11, wherein matching the eigenvalues of the nodes in the execution plan of the historical query statement to the eigenvalues of the key component elements comprises at least one of: accurate matching, subset matching, superset matching and fuzzy matching.

18. The system according to claim 11, wherein matching the eigenvalues of the nodes in the execution plan of the historical query statement to the eigenvalues of the key component elements comprises:

taking an AND operation to the eigenvalues of the key component elements and corresponding eigenvalues of nodes in the execution plan;

based on a result from the AND operation being equal to the eigenvalues of the key component elements, determining the success of matching the eigenvalues of the key component elements to the eigenvalues of the nodes in the execution plan of the historical query statement.

19. The system according to claim 11, wherein the generating an execution plan of the query statement comprises:

specifying the execution plan corresponding to the nodes as at least one part of the execution plan of the query statement.

20. A computer program product for an eigenvalue-based data query, the computer program product comprising a computer readable storage medium having program instructions embodied therewith, the program instructions readable by a processing circuit to cause the processing circuit to implement:

receiving a query request that includes a query statement;

calculating eigenvalues of key component elements in the query statement;

matching eigenvalues of nodes in an execution plan of a historical query statement to the eigenvalues of the key component elements;

based on determining success of matching the eigenvalues of the key component elements to the eigenvalues of the nodes in the execution plan of the historical query statement, generating an execution plan of the query statement; and establishing a global table set sequence based on all tables in a database management system.

* * * * *